United States Patent
Ahmet et al.

(10) Patent No.: US 10,681,621 B2
(45) Date of Patent: Jun. 9, 2020

(54) NARROWBAND INTERNET OF THINGS DEVICE CHANNEL SCANNING

(71) Applicant: T-Mobile USA, Inc., Bellevue, WA (US)

(72) Inventors: Jeff Ahmet, Issaquah, WA (US); Puja Gupta, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 144 days.

(21) Appl. No.: 15/842,640

(22) Filed: Dec. 14, 2017

(65) Prior Publication Data

US 2019/0191363 A1 Jun. 20, 2019

(51) Int. Cl.
*H04W 48/16* (2009.01)
*H04W 72/04* (2009.01)
*H04L 29/08* (2006.01)
*H04W 16/14* (2009.01)

(52) U.S. Cl.
CPC .............. *H04W 48/16* (2013.01); *H04L 67/12* (2013.01); *H04L 67/22* (2013.01); *H04W 72/0446* (2013.01); *H04W 72/0453* (2013.01); *H04W 16/14* (2013.01); *H04W 72/048* (2013.01)

(58) Field of Classification Search
CPC ............. H04W 48/16; H04W 72/0453; H04W 72/0446
See application file for complete search history.

(56) References Cited

U.S. PATENT DOCUMENTS

| | | | | |
|---|---|---|---|---|
| 9,491,693 | B1* | 11/2016 | Chuttani | H04W 48/16 |
| 9,906,991 | B1* | 2/2018 | Peddiraju | H04W 76/28 |
| 2012/0014414 | A1* | 1/2012 | Jeong | H04B 1/7143 |
| | | | | 375/138 |
| 2012/0270537 | A1* | 10/2012 | Weng | H04W 48/16 |
| | | | | 455/424 |
| 2013/0229955 | A1* | 9/2013 | Xu | H04W 52/18 |
| | | | | 370/280 |
| 2016/0127969 | A1* | 5/2016 | Pao | H04W 48/20 |
| | | | | 455/437 |
| 2016/0157150 | A1* | 6/2016 | Wirtanen | H04W 48/16 |
| | | | | 455/434 |

(Continued)

FOREIGN PATENT DOCUMENTS

| | | |
|---|---|---|
| KR | 20170093679 | 8/2017 |
| WO | WO2017019133 A1 | 2/2017 |

OTHER PUBLICATIONS

PCT Search Report and Written Opinion dated Mar. 7, 2019 for PCT Application No. PCT/US18/63099, 10 pages.

*Primary Examiner* — Parth Patel
(74) *Attorney, Agent, or Firm* — Lee & Hayes, P.C.

(57) ABSTRACT

A NarrowBand Internet of Things (NB-IoT) device can find a connection to an NB-IoT cell by searching for an available NB-IoT carrier. An available NB-IoT carrier can be found by scanning through frequencies associated with a plurality of channel numbers on a predefined NB-IoT channel list, the plurality of channel numbers being associated with a plurality of NB-IoT carriers offered by one or more base stations. The NB-IoT carriers are frequency bands within a larger spectrum band associated with a telecommunications provider. The NB-IoT device can camp on a particular NB-IoT carrier when the particular NB-IoT carrier has an available physical resource block (PRB).

20 Claims, 7 Drawing Sheets

(56) References Cited

U.S. PATENT DOCUMENTS

| | | | |
|---|---|---|---|
| 2017/0041773 A1* | 2/2017 | Fujishiro | H04W 8/005 |
| 2017/0230961 A1* | 8/2017 | Park | H04L 5/0055 |
| 2017/0311250 A1* | 10/2017 | Rico Alvarino | H04W 4/70 |
| 2017/0339629 A1* | 11/2017 | Lindoff | H04W 76/27 |
| 2017/0339640 A1* | 11/2017 | Krishnamoorthy | H04W 52/0229 |
| 2018/0049164 A1* | 2/2018 | Wu | H04W 72/042 |
| 2018/0049193 A1* | 2/2018 | Belleschi | H04W 72/02 |
| 2018/0063736 A1* | 3/2018 | Sadeghi | H04W 72/0446 |
| 2018/0063841 A1* | 3/2018 | Song | H04W 48/06 |
| 2018/0070243 A1* | 3/2018 | Liu | H04W 74/0808 |
| 2018/0098293 A1* | 4/2018 | Jiang | H04L 27/2617 |
| 2018/0191416 A1* | 7/2018 | Palenius | H04B 7/0617 |
| 2018/0241495 A1* | 8/2018 | Xue | H04J 11/00 |
| 2018/0317161 A1* | 11/2018 | Abedini | H04W 48/16 |
| 2018/0317278 A1* | 11/2018 | Fujishiro | H04W 92/18 |
| 2018/0324742 A1* | 11/2018 | Agarwal | H04W 64/003 |
| 2018/0324748 A1* | 11/2018 | Nord | H04W 68/02 |
| 2018/0376484 A1* | 12/2018 | Beale | H04L 5/0037 |
| 2019/0028141 A1* | 1/2019 | Padden | H04B 1/7156 |
| 2019/0037389 A1* | 1/2019 | Rai | H04W 8/22 |
| 2019/0053144 A1* | 2/2019 | Subramani | H04B 17/102 |
| 2019/0053175 A1* | 2/2019 | Kubota | H04W 76/15 |
| 2019/0053245 A1* | 2/2019 | Furuichi | H04W 72/082 |
| 2019/0069150 A1* | 2/2019 | Blankenship | H04L 5/0007 |
| 2019/0069229 A1* | 2/2019 | Lee | H04W 88/06 |
| 2019/0081753 A1* | 3/2019 | Jung | H04B 7/0617 |
| 2019/0124522 A1* | 4/2019 | Cao | H04W 16/30 |
| 2019/0132854 A1* | 5/2019 | Nakamura | H04W 72/04 |
| 2019/0141783 A1* | 5/2019 | Malik | H04W 88/06 |
| 2019/0159280 A1* | 5/2019 | Chakraborty | H04W 76/28 |
| 2019/0174378 A1* | 6/2019 | Chang | H04W 4/80 |
| 2019/0174529 A1* | 6/2019 | Tie | H04W 72/12 |
| 2019/0182822 A1* | 6/2019 | Takeda | H04W 74/006 |
| 2019/0222656 A1* | 7/2019 | Cao | H04L 29/08 |
| 2019/0239051 A1* | 8/2019 | Hwang | H04W 4/80 |
| 2019/0246371 A1* | 8/2019 | Hwang | H04J 11/00 |
| 2019/0349775 A1* | 11/2019 | Sui | H04L 67/12 |
| 2019/0357270 A1* | 11/2019 | Kurth | H04W 74/0833 |

* cited by examiner

NARROWBAND INTERNET OF THINGS DEVICE CHANNEL SCANNING

BACKGROUND

Traditionally, most objects did not have wireless data connections that allowed them to connect to the Internet or other networks. However, "Internet of Things" (IoT) devices are being developed that have such wireless data connections and can use them to connect to the Internet, other networks, and/or other devices. For example, an IoT device can be a "smart" doorbell that sends a signal to a remote server and/or a homeowner's mobile phone when a visitor rings the doorbell.

Some IoT devices may routinely send and/or receive large amounts of data. For example, an internet-connected security camera can continually upload a video stream to a cloud server. Such IoT devices are often connected to an external power source.

However, other IoT devices may only occasionally send or receive data, and/or only send small amounts of data. For example, an industrial sensor can occasionally send a few bytes of data on infrequent occasions when it detects a particular condition in its surrounding environment. Due to the infrequent nature of these data transmissions and the relatively small amount of data transferred, these types of IoT devices can use a narrow spectrum of frequencies to send and/or receive data over long distances using relatively low data transfer rates. They can accordingly be referred to as NarrowBand (NB) IoT devices. NB-IoT devices often operate on battery power, because infrequently sending and/or receiving small amounts of data may not use much energy, allowing NB-IoT devices to be deployed almost anywhere.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
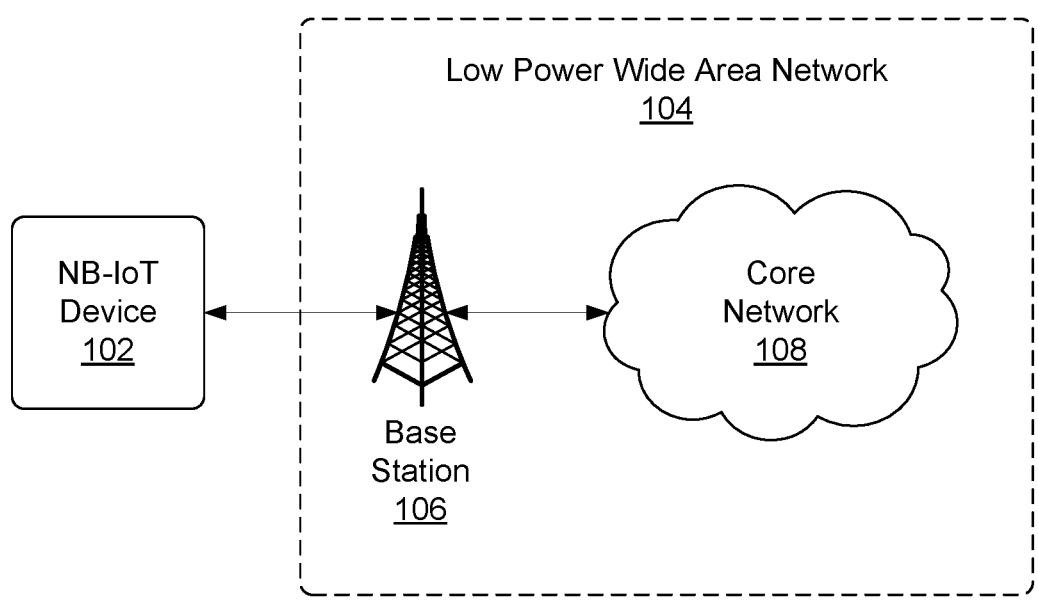
FIG. 1 depicts a NarrowBand (NB) Internet of Things (IoT) device connected to a Low Power Wide Area Network (LPWAN).

NarrowBand (NB) Internet of Things (IoT) devices are devices that can wirelessly connect to an NB-IoT cell operated by a telecommunications provider, in order to send and/or receive data through the NB-IoT cell. NB-IoT devices can also run on battery power, such that they can be deployed at almost any location without wiring them to an existing electrical grid. 3GPP Release 13 added Cat-NB1 to define some aspects of NB-IoT technology.

NB-IoT devices can include sensors, actuators, meters, appliances, municipal infrastructure equipment, and/or any other type of device. For example, an NB-IoT device can be a "smart" parking meter that can use a wireless data connection to report whether or not a parking space is vacant. As another example, an NB-IoT device can be an irrigation sensor embedded at least partially in soil, such that it can use its wireless data connection to report moisture levels in the soil.

NB-IoT devices can use a narrow band of a frequency spectrum to wirelessly send and/or receive data. For example, some NB-IoT devices use a narrow band of 180 kilohertz (kHz) to send and/or receive data, as will be discussed further below. NB-IoT devices also generally send and/or receive relatively small amounts of data on an infrequent basis using low data transfer rates. For example, some NB-IoT devices can send and/or receive data at rates of 250 kilobits per second (kbps) or less. These qualities can allow NB-IoT devices to use relatively low amounts of power when sending and/or receiving data.

However, aside from sending and/or receiving data, an NB-IoT device's battery can also be drained when the NB-IoT device acquires a connection to an NB-IoT cell. As will be described below, an NB-IoT device can search for an available NB-IoT carrier provided by a base station of an NB-IoT cell. For example, when an NB-IoT device is turned on, or is moved, it can search for an available NB-IoT cell that it can camp on, such that it can use that NB-IoT cell when it sends and/or receives data via its wireless data connection. Similarly, an NB-IoT device can at least occasionally scan for available NB-IoT cells to ensure that an NB-IoT cell that it is camping on is still available and can be used to transfer data to and/or from the NB-IoT device.

Some existing NB-IoT devices are configured to scan through frequencies in one or more entire spectrum bands associated with a telecommunication provider in order to acquire a connection to an NB-IoT cell. For example, for a spectrum band of 60 megahertz (MHz), some NB-IoT devices are configured to check frequencies spaced 100 kHz apart to look for an available connection to an NB-IoT cell. Accordingly, such an NB-IoT device may need to scan through up to 600 possible frequencies to find an available NB-IoT cell.

Unlike batteries in smartphones and other types of devices, the batteries of NB-IoT devices are intended to last for long periods of time without being recharged. Performing the intensive scanning operation described above on an at least occasional basis can deteriorate the NB-IoT device's battery power and/or decrease the overall lifespan of the NB-IoT device. Scanning one or more entire spectrum bands can also cause an NB-IoT device to take a relatively long amount of time to find a suitable NB-IoT cell.

Despite low power usage during data transmissions, an NB-IoT device's battery will eventually run low due to data transmissions, searching for NB-IoT cells, and/or other operations. It can be expensive, time-consuming, and/or labor-intensive when personnel must travel to an NB-IoT device and either change its battery or replace the NB-IoT device.

Described herein are systems and methods for reducing the number of channels an NB-IoT device scans when searching for an NB-IoT cell. This can accordingly enhance an NB-IoT device's battery life and/or enhance the life of the NB-IoT device overall. It can also decrease the amount of time it taken an NB-IoT device to find a suitable NB-IoT cell.

Example Environment

FIG. 1 depicts a NarrowBand (NB) Internet of Things (IoT) device 102 connected to a Low Power Wide Area Network (LPWAN) 104. An LPWAN 104 can include one or more base stations 106 within corresponding NB-IoT cells to which NB-IoT devices 102 can connect. The base stations 106 can be connected to a core network 108, which itself can be connected to the Internet and/or other networks. Accordingly, when an NB-IoT device 102 connects to the core network 108 through a base station 106, the NB-IoT device 102 can exchange data with other elements connected to the core network 108, such as a remote Internet server or other NB-IoT devices 102.

An NB-IoT device 102 can be any type of device that runs on battery power and includes a wireless data connection through which it can connect to a base station 106. NB-IoT devices 102 can be sensors, actuators, meters, appliances, municipal infrastructure equipment, and/or any other type of device. An example NB-IoT device 102 is illustrated in greater detail in FIG. 4 and is described in detail below with reference to that figure.

The base stations 106 and/or core network 108 can be operated by a telecommunication provider. In some examples, a base station 106 can be a cell tower or other network node that also offers access to the core network 108 through one or more other types of wireless connectivity. For example, the base station 106 can be an eNode B (eNB) that offers Long-Term Evolution (LTE) connections in addition to NB-IoT connections. In this example, the base station 106 and core network 108 can be part of an LTE network in addition to being part of the LPWAN 104. An example base station 106 is illustrated in greater detail in FIG. 5 and is described in detail below with reference to that figure.

Figure 2A:
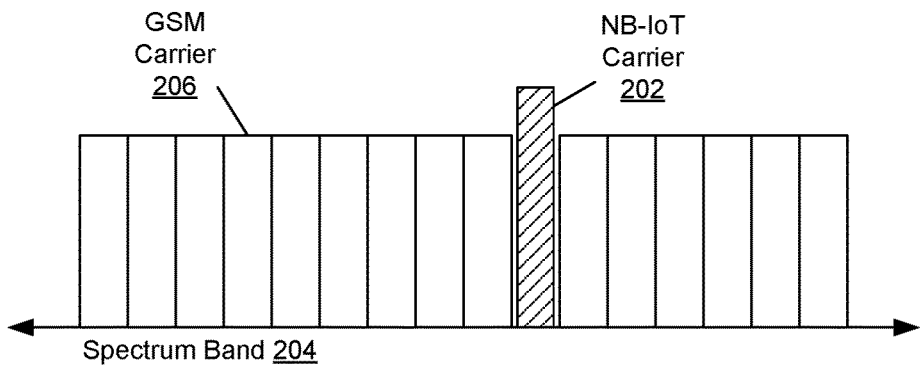
FIG. 2A depicts a standalone NB-IoT carrier.
Figure 2B:
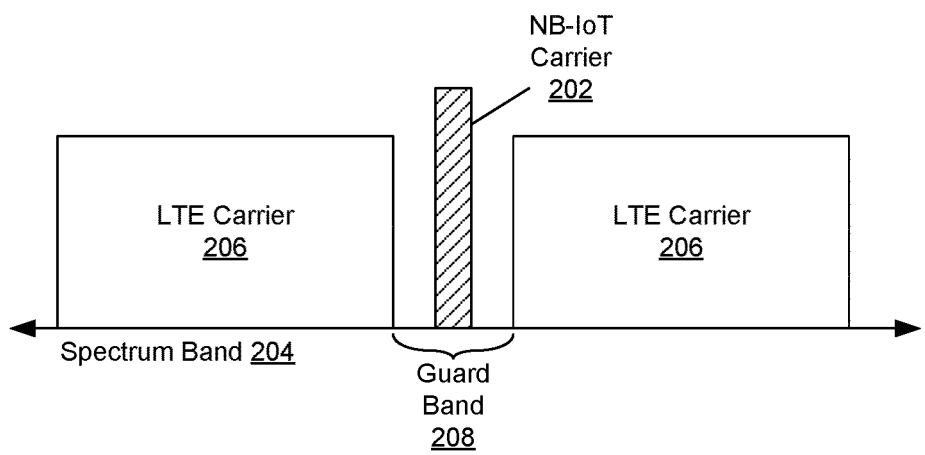
FIG. 2B depicts a guard band NB-IoT carrier.
Figure 2C:
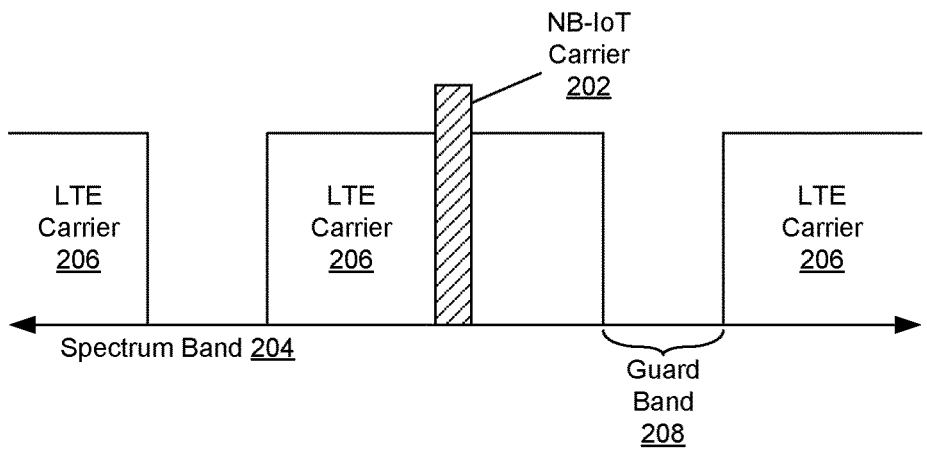
FIG. 2C depicts an in-band NB-IoT carrier.

FIGS. 2A-2C depict examples of NB-IoT carriers 202. An NB-IoT carrier 202 is a frequency range that can be used to wirelessly exchange data between an NB-IoT device 102 and a base station 106. A telecommunications provider can configure a base station 106 to offer one or more NB-IoT carriers 202 within a larger spectrum band 204. An NB-IoT carrier 202 can be located in or around other types of carriers 206 designated for other types of traffic.

In some examples, an NB-IoT device 102 can send data to, or receive data from, a base station 106 using a bandwidth of 180 kHz. Accordingly, each NB-IoT carrier 202 can be at least 180 kHz wide to accommodate signals to and/or from an NB-IoT device 102. In other examples, the bandwidth of transmissions to or from an NB-IoT device, and the corresponding size of an NB-IoT carrier 202, can be larger or smaller than 180 kHz.

FIG. 2A depicts a standalone NB-IoT carrier 202. A standalone NB-IoT carrier 202 can be positioned in a frequency range of the telecommunications provider spectrum band 204 that is not otherwise assigned to a purpose. For example, a 200 kHz frequency range that was previously used as a 2G Global System for Mobile Communications (GSM) carrier 206 can be repurposed for a standalone NB-IoT carrier 202 in that range.

FIG. 2B depicts a guard band NB-IoT carrier 202. A guard band NB-IoT carrier 202 can be positioned in a guard band 208, a frequency range that has been reserved by a telecommunications provider between two other carriers 206. For example, an LTE network can have multiple LTE carriers 206 within a larger spectrum band 204, with the LTE carriers 206 being separated by guard bands 208 to prevent interference between the LTE carriers 206. In this situation, a guard band NB-IoT carrier 202 can be positioned within a guard band 208 between two LTE carriers 206.

FIG. 2C depicts an in-band NB-IoT carrier 202. An in-band NB-IoT carrier 202 can be positioned within a larger carrier 206 of another type. For example, an in-band NB-IoT carrier 202 can be a 180 kHz slice of a larger LTE carrier 206, such as an LTE carrier 206 that is 15 MHz or 20 MHz wide.

A telecommunications provider can provide multiple NB-IoT carriers 202 via one or more base stations 106. For example, an operator of an LTE network that has multiple LTE carriers 206 within a spectrum band 204 can have some standalone NB-IoT carriers 202 in the spectrum band 204 outside of a range used for the LTE carriers 206, some guard band NB-IoT carriers 202 in guard bands 208 between the LTE carriers 206, and/or some in-band NB-IoT carriers 202 within LTE carriers 206.

Each NB-IoT carrier 202 can be associated with one physical resource block (PRB) of a larger spectrum band 204. A PRB can be allocated to a particular NB-IoT device 102 when that NB-IoT device 102 connects to the base station 106 and/or is engaged in communications via the corresponding NB-IoT carrier 202.

An NB-IoT device 102 can perform searches to find an NB-IoT carrier 202 that has an available PRB, such that it can camp on that NB-IoT carrier 202 and be ready to send and/or receive data. For example, an NB-IoT device 102 can search for an available NB-IoT carrier 202 when it is turned on or is moved to a new location. An NB-IoT device 102 can also perform occasional searches to check that an NB-IoT carrier 202 to which it was previously connected is still available.

Figure 3:
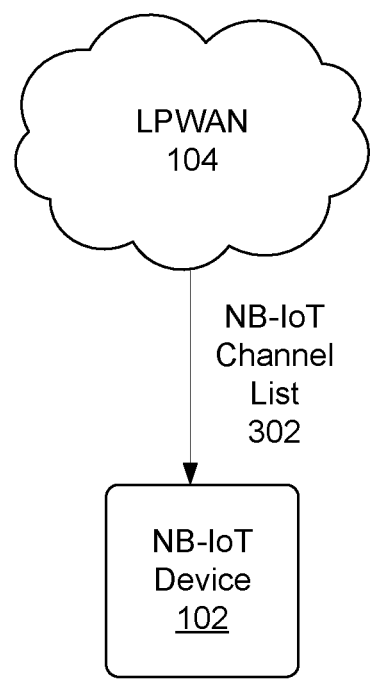
FIG. 3 depicts an LPWAN providing an NB-IoT device with an NB-IoT channel list.

FIG. 3 depicts an LPWAN 104 providing an NB-IoT device 102 with an NB-IoT channel list 302. A telecommunications provider can provide NB-IoT devices 102 with a predefined and/or updatable NB-IoT channel list 302 that includes a plurality of channel numbers associated with NB-IoT carriers 202 offered by the telecommunications provider.

Each channel number on an NB-IoT channel list 302 can identify a different NB-IoT carrier 202 offered by one or more base stations 106. A channel number can be associated with a frequency within a corresponding NB-IoT carrier 202. Accordingly, the NB-IoT channel list 302 can include channel numbers associated with frequencies of multiple NB-IoT carriers 202 in a larger spectrum band 204, including frequencies in and/or around other types of carriers 206. For example, an NB-IoT channel list 302 can include channel numbers associated with frequencies of standalone NB-IoT carriers 202, guard band NB-IoT carriers 202, and/or in-band NB-IoT carriers 202.

In some examples, the channel numbers in an NB-IoT channel list 302 can be Evolved Absolute Radio Frequency Channel Numbers (EARFCNs). An EARFCN can indicate the center frequency of a particular NB-IoT carrier 202. In other examples, the channel numbers can be Absolute Radio Frequency Channel Numbers (ARFCNs), UTRA Absolute Radio Frequency Channel Numbers (UARFCN), or any other type of channel number.

An NB-IoT device 102 can accordingly use a predefined NB-IoT channel list 302 to search for an available NB-IoT carrier 202 using the channel numbers on the NB-IoT channel list 302. An NB-IoT channel list 302 can have a smaller set of channel numbers than the set of all possible locations at which an NB-IoT carrier 202 could be located within a spectrum band 204. Searching through the set of channel numbers on the NB-IoT channel list 302 can therefore save an NB-IoT device 102 time and/or energy compared to searching through one or more entire spectrum bands 204.

For example, without a predefined NB-IoT channel list 302, an NB-IoT device 102 may search for an available NB-IoT carrier 202 at frequencies 100 kHz apart, such that it may search up to 600 times in a 60 MHz spectrum band 204. In contrast, when the NB-IoT device 102 is provided with a predefined NB-IoT channel list 302 that has only 10 or 20 channel numbers, the NB-IoT device 102 can search frequencies associated with those 10 or 20 channel numbers to find an available NB-IoT carrier 202, thereby saving time and/or battery usage compared to scanning through 600 frequencies in a 60 MHz entire spectrum band 204.

An NB-IoT device 102 can be provided with an NB-IoT channel list 302 through a network connection and/or any other type of data connection. For example, a manufacturer can load a new NB-IoT device 102 with a predefined NB-IoT channel list 302 it has received from a telecommunications provider. Later, after the NB-IoT device 102 has connected to a base station 106, the telecommunications provider can use the established connection to provide the NB-IoT device 102 with an updated NB-IoT channel list 302. As another example, an NB-IoT device 102 can be provided with a new or updated NB-IoT channel list 302 through a firmware update or software update.

In some examples, a telecommunication provider can provide different NB-IoT channel lists 302 to different NB-IoT devices 102. For instance, while a first NB-IoT channel list 302 can include a first set of channel numbers, a second NB-IoT channel list 302 can include a second set of channel numbers that may or may not overlap with the first set of channel numbers. Accordingly, two NB-IoT devices 102 that use different NB-IoT channel lists 302 can search different sets of channel numbers for available NB-IoT carriers 202.

A telecommunication provider can track usage of particular NB-IoT carriers 202 over time. To perform load balancing and/or avoid congestion on one or more individual NB-IoT carriers 202, the telecommunication provider can use the tracked usage data to adjust which channel numbers are included in NB-IoT channel lists 302 provided to different NB-IoT devices 102. For example, when a telecommunication provider determines that a first NB-IoT carrier 202 is commonly in use and a second NB-IoT carrier 202 is less likely be in use, the telecommunication provider can include a channel number of the second NB-IoT carrier 202 in more NB-IoT channel lists 302 than a channel number of the first NB-IoT carrier 202. Accordingly, more NB-IoT devices 102 can begin to search the second NB-IoT carrier 202 for an available connection, such that usage of the first and second NB-IoT carriers 202 can be balanced.

In some examples, the channel numbers included in an NB-IoT channel lists 302 provided to a particular NB-IoT device 102 can be based on the location of the NB-IoT device 102. For example, an NB-IoT device 102 deployed in a particular location can be provided with an NB-IoT channel list 302 that includes channel numbers associated with NB-IoT carriers 202 expected to be offered by base stations 104 near that location. The NB-IoT device's location 102 can be determined based on the location of a base station 106 to which it establishes a connection, based on GPS coordinates or other location data reported by the NB-IoT device 102, based on user input, or based on any other type of location information.

Example Architecture

Figure 4:
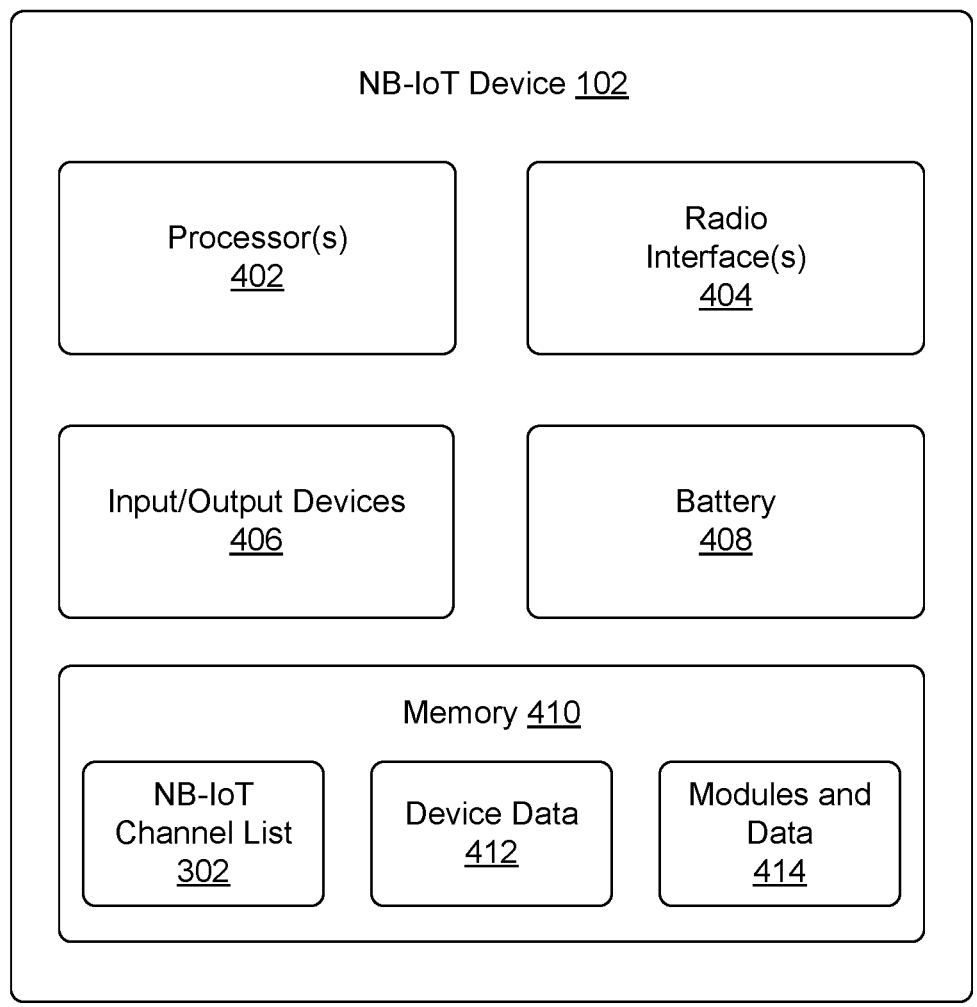
FIG. 4 depicts an example system architecture for an NB-IoT device.

FIG. 4 depicts an example system architecture for an NB-IoT device 102. As shown, an NB-IoT device 102 can include processor(s) 402, radio interfaces 404, input and/or output devices 406, a battery 408, and memory 410. The memory 410 can store an NB-IoT channel list 302, device data 412, and/or other modules and data 414.

In various examples, the processor(s) 402 can be a central processing unit (CPU), a graphics processing unit (GPU), or both CPU and GPU, or any other type of processing unit. Each of the one or more processor(s) 402 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 402 may also be responsible for executing all computer applications stored in the memory 410, which can be associated with common types of volatile (RAM) and/or nonvolatile (ROM) memory.

The radio interfaces 404 can include transceivers, modems, interfaces, antennas, and/or other components that perform or assist in exchanging radio frequency (RF) communications with a base station 106. In particular, the radio interfaces 404 can search for an available NB-IoT carrier 202 using the NB-IoT channel list 302, and/or establish a connection with a base station 106 over an NB-IoT carrier 202. In other examples a processor 402, other modules and data 414, and/or other components of the NB-IoT device 102 can perform or assist in transmitting and/or receiving data, and/or pre-processing or post-processing of such data.

Depending on the nature of the NB-IoT device 102, the NB-IoT device 102 can have one or more input devices 406 and/or output devices 406. Input devices 406 can be sensors, cameras, microphones, user input devices, and/or any other input device through which an NB-IoT device 102 can obtain data about its environment and/or receive data from users or other devices. For example, when the NB-IoT device 102 is a "smart" parking meter, it can include one or more sensors that can detect whether a parking space is vacant. Measurements, sensor reading, captured audio, images, or video, or any other data obtained by the input devices 406 can be stored in memory 410 as device data 412. Some NB-IoT devices 102 can have output devices 406, such as screens or speakers, through which it can display or otherwise output data received via a connection to a base station 106.

The battery 408 can provide power to the processor(s) 402, radio interfaces 404, input and output devices 406, and/or any other components of the NB-IoT device 102. In some examples the battery 408 can store enough energy to power the NB-IoT device 102 for an extended period of time without recharging or replacement. However, as described herein, use of an NB-IoT channel list 302 can further extend the life of the battery 408.

Memory 410 can include system memory, which may be volatile (such as RAM), non-volatile (such as ROM, flash memory, etc.) or some combination of the two. Memory 410 can further include machine readable media and/or non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the NB-IoT device 102. Any such non-transitory computer-readable media may be part of the NB-IoT device 102.

Modules and data 414 stored in memory 410 can be utilized by the NB-IoT device 102 to perform or enable performing any action taken by the NB-IoT device 102. The modules and data 414 can include an NB-IoT device platform and applications, and data utilized by the platform and applications.

The NB-IoT device 102 can have one or more sets of instructions, such as software or firmware, that embodies any one or more of the methodologies or functions described herein. The instructions can reside, completely or at least partially, within the memory 410, processor(s) 402, and/or radio interface(s) 404 during execution thereof by the NB-IoT device 102. The memory 410 and the processor(s) 402 also can constitute machine readable media.

Figure 5:
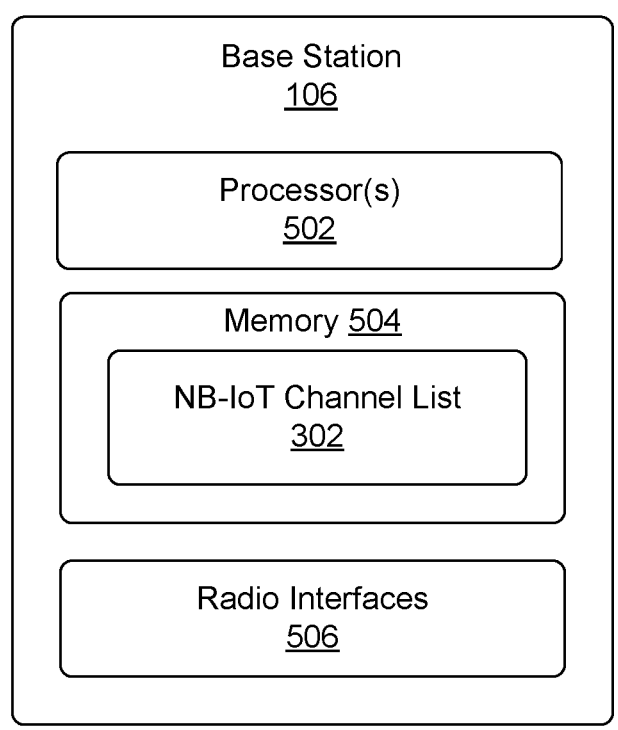
FIG. 5 depicts an example system architecture for a base station.

FIG. 5 depicts an example system architecture for a base station 106. As shown, a base station 106 can include processor(s) 502, memory 504, and radio interfaces 506.

In various examples, the processor(s) 502 can be a central processing unit (CPU), a graphics processing unit (GPU), both CPU and GPU, or any other type of processing unit. Each of the one or more processor(s) 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 502 may also be responsible for executing all computer applications stored in the memory 504, which can be associated with common types of volatile (RAM) and/or nonvolatile (ROM) memory.

In various examples, memory 504 can include system memory, which may be volatile (such as RAM), non-volatile (such as ROM, flash memory, etc.) or some combination of the two. The memory 504 can also include additional data storage devices (removable and/or non-removable) such as, for example, magnetic disks, optical disks, or tape. Memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the base station 106. Any such non-transitory computer-readable media may be part of the base station 106.

The radio interfaces 506 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more NB-IoT devices 102, transmit and/or receive data, and monitor the connections. The radio interfaces 506 can also allocate PRBs associated with NB-IoT carriers 202 to NB-IoT devices 102.

The memory 504 can store an NB-IoT channel list 302 that includes channel numbers associated with NB-IoT carriers 202, as described above. The base station 106 can provide the NB-IoT channel list 302 to NB-IoT devices when they are connected to the base station 106. The base station 106 can receive new NB-IoT channel lists 302 from a telecommunications provider, and/or update the NB-IoT channel list 302 when it changes the NB-IoT carriers 202 it offers. Accordingly, when the NB-IoT channel list 302 is updated, the base station 106 can provide the updated NB-IoT channel list 302 from its memory 504 to connected NB-IoT devices 102.

Example Operations

Figure 6:
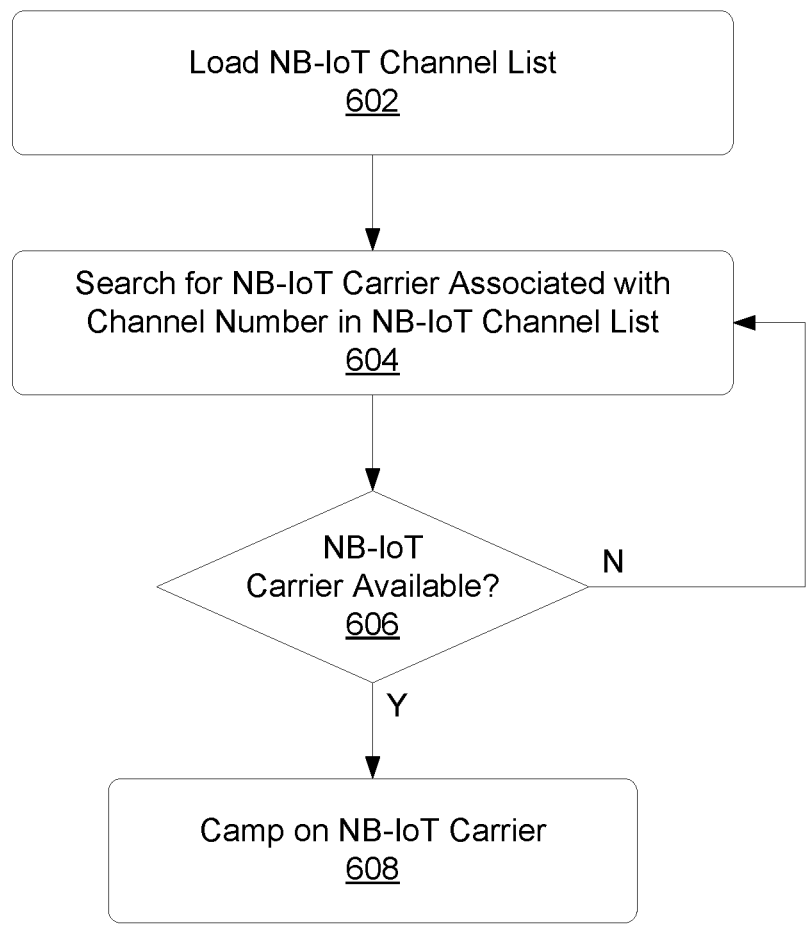
FIG. 6 depicts a flow chart of an exemplary method for finding an available NB-IoT carrier with an NB-IoT device using an NB-IoT channel list.

FIG. 6 depicts a flow chart of an exemplary method for finding an available NB-IoT carrier 202 with an NB-IoT device 102 using an NB-IoT channel list 302.

At block 602, an NB-IoT device 102 can load an NB-IoT channel list 302. As described above, the NB-IoT channel list 302 can include a predefined set of channel numbers, such as EARFCNs, that are associated with NB-IoT carriers 202.

At block 604, the NB-IoT device 102 can search for an available connection to an NB-IoT carrier 202 associated with one of the channel numbers in the NB-IoT channel list 302. For example, the NB-IoT device 102 can search frequencies associated with the channel number to determine if a base station 106 within range has an NB-IoT carrier 202 associated with the channel number that has an available PRB.

At block 606, the NB-IoT device 102 can determine if an NB-IoT carrier 202 associated with the channel number is available. If no NB-IoT carrier 202 associated with the channel number is available, such as if the NB-IoT device 102 cannot find an NB-IoT carrier 202 at frequencies associated with the channel number, or if the PRB of the NB-IoT carrier 202 has already been allocated to another NB-IoT device 102, the NB-IoT device 102 can return to block 604 and search for an NB-IoT carrier 202 associated with another channel number in the NB-IoT channel list 302.

However, if at block 606 the NB-IoT device 102 finds that NB-IoT carrier 202 associated with the channel number is available, at block 608 the NB-IoT device 102 can camp on the NB-IoT carrier 202. In some examples, the base station 106 offering the NB-IoT carrier 202 can allocate an associated PRB to the NB-IoT device 102. Accordingly, the NB-IoT device 102 can use the NB-IoT carrier 202 to send and/or receive data.

An NB-IoT device 102 can repeat the process of FIG. 6 occasionally and/or periodically to search for available NB-IoT carriers 202. For example, an NB-IoT device 102 can use the process of FIG. 6 when it is turned on or moved to a new location. As another example, an NB-IoT device 102 can use the process of FIG. 6 on a preset schedule, such as every hour.

In some examples, when an NB-IoT device 102 previously found and camped on an available NB-IoT carrier 202 using the process of FIG. 6, during its next search the NB-IoT device 102 can first check if the previous NB-IoT carrier 202 remains available. If the previous NB-IoT carrier 202 is no longer available, the NB-IoT device 102 can then use the process of FIG. 6 to find another NB-IoT carrier 202.

Figure 7:
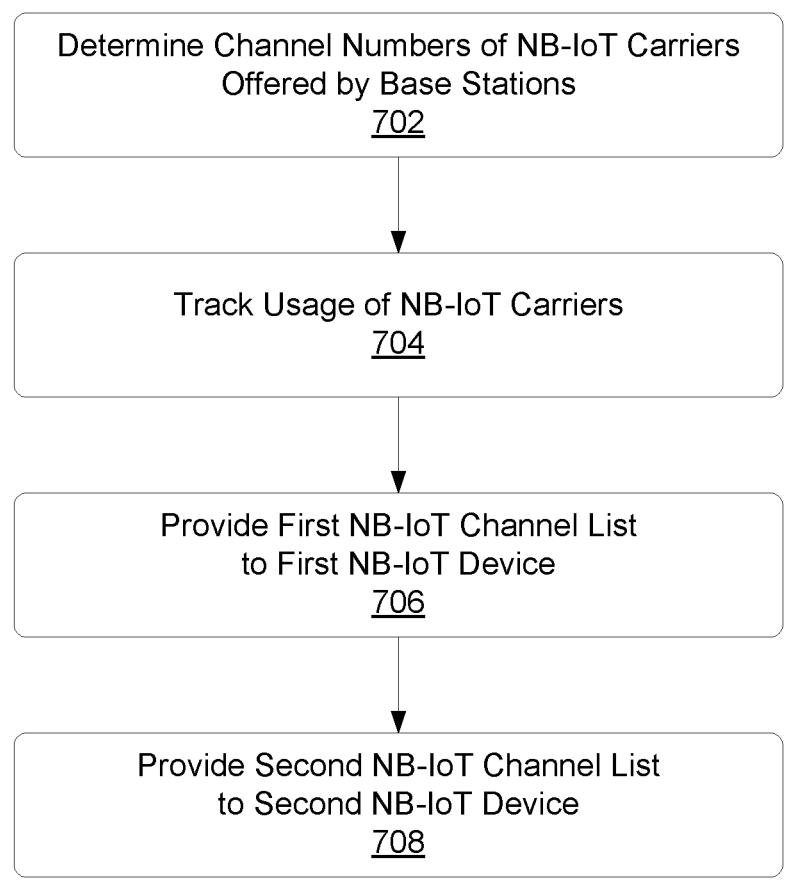
FIG. 7 depicts a flow chart of an exemplary method for providing NB-IoT channel lists to NB-IoT devices.

FIG. 7 depicts a flow chart of an exemplary method for providing NB-IoT channel lists 302 to NB-IoT devices 102.

At block 702, a telecommunication provider can determine channel numbers of NB-IoT carriers 202 offered by its base stations 106. A channel number can be associated with frequencies of an NB-IoT carrier 202. For example, a channel number can be an EARFCN or other number that indicates a center frequency of an NB-IoT carrier 202.

At block 704, the telecommunication provider can track usage of the NB-IoT carriers 202 offered by its base stations 106. For example, the telecommunication provider can monitor how often PRBs of the NB-IoT carriers 202 are allocated to NB-IoT devices 102, how many times such PRBs are allocated, how much data is transferred over the NB-IoT carriers 202, and/or any other types of usage data.

At block 706, the telecommunication provider can provide a first NB-IoT channel list 302 to a first NB-IoT device 102. The first NB-IoT channel list 302 can include first set of channel numbers associated with a first set of NB-IoT carriers 202. In some examples, the first set of channel numbers can be selected based on the location of the first NB-IoT device 102.

At block 708, the telecommunication provider can provide a second NB-IoT channel list 302 to a second NB-IoT device 102. The second NB-IoT channel list 302 can include a second set of channel numbers associated with a second set of NB-IoT carriers 202. In some situations, the second set of channel numbers can be at least partially different than the first set of channel numbers. For example, the second set of channel numbers can be selected based on the location of the second NB-IoT device 102. Accordingly, when the first and second NB-IoT devices 102 are located in different areas and base stations in those areas offer different NB-IoT carriers 202, the first and second NB-IoT channel lists 302 can accordingly include different channel numbers that correspond to those NB-IoT carriers 202. As another example, when the usage data tracked by the telecommunication provider at block 704 shows a risk of congestion on one or more NB-IoT carriers 202, the telecommunication provider can include different channel numbers in the first and second NB-IoT channel lists 302 such that the first and second NB-IoT devices 102 do not search for the same NB-IoT carriers 202.

Conclusion

By searching for an available NB-IoT carrier 202 using a set of channel numbers in a predefined NB-IoT channel list 302, instead of searching through frequencies of an entire spectrum band 204 or other type of carrier 206, an NB-IoT device 102 can find an available NB-IoT carrier 202 more quickly. This can save the NB-IoT device's battery life and/or extend the overall life of the NB-IoT device 102.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method of finding a connection to a NarrowBand Internet of Things (NB-IoT) cell, comprising:
    searching, by an NB-IoT device, for an NB-IoT carrier having an associated physical resource block (PRB) by scanning through frequencies associated with a plurality of channel numbers on a predefined NB-IoT channel list, the plurality of channel numbers being associated with a plurality of NB-IoT carriers offered by one or more base stations;
    finding, by the NB-IoT device as a result of the searching, no NB-IoT carrier associated with a channel number of the plurality of channel numbers on the predefined NB-IoT channel list having the associated PRB;
    in response to finding no NB-IoT carrier associated with the channel number of the plurality of channel numbers on the predefined NB-IoT channel list having the associated PRB, allocating, by a base station of the one or more base stations, the associated PRB to an available NB-IoT carrier; and
    camping, by the NB-IoT device, on the available NB-IoT carrier of the plurality of NB-IoT carriers upon being allocated the associated PRB,
    wherein individual ones of the plurality of NB-IoT carriers are frequency bands within a larger spectrum band associated with a telecommunications provider.

2. The method of claim 1, wherein the plurality of channel numbers is Evolved Absolute Radio Frequency Channel Numbers (EARFCNS) that indicate center frequencies of the NB-IoT carriers.

3. The method of claim 1, further comprising receiving, by the NB-IoT device, the predefined NB-IoT channel list from a telecommunication network.

4. The method of claim 1, wherein at least one of the plurality of NB-IoT carriers is 180 kHz wide.

5. The method of claim 1, wherein the NB-IoT device searches for the available NB-IoT carrier using the predefined NB-IoT channel list upon the NB-IoT device being turned on.

6. The method of claim 1, wherein the NB-IoT device searches for the available NB-IoT carrier using the predefined NB-IoT channel list upon the NB-IoT device being moved to a new location.

7. The method of claim 1, wherein the NB-IoT device searches for the available NB-IoT carrier using the predefined NB-IoT channel list on a preset schedule.

8. The method of claim 7, wherein the NB-IoT device searches for the available NB-IoT carrier using the predefined NB-IoT channel list on the preset schedule after a determination that a previously connected NB-IoT carrier is no longer available.

9. The method of claim 1, wherein the plurality of NB-IoT carriers comprises standalone NB-IoT carriers repurposed from a Global System for Mobile Communications (GSM) carrier in the larger spectrum band, guard band NB-IoT carriers positioned between two Long-Term Evolution (LTE) carriers in the larger spectrum band, and/or in-band NB-IoT carriers positioned within LTE carriers in the larger spectrum band.

10. A NarrowBand Internet of Things (NB-IoT) device, comprising:
    one or more processors,
    a radio interface configured to communicate with a base station via an available NB-IoT carrier; and
    memory storing a predefined NB-IoT channel list and computer-executable instructions;
    wherein the predefined NB-IoT channel list includes a plurality of channel numbers associated with a plurality of NB-IoT carriers, the plurality of channel numbers being associated with the plurality of NB-IoT carriers that are frequency bands within a larger spectrum band associated with a telecommunications provider, and
    wherein the computer-executable instructions that, when executed by the one or more processors, cause the one or more processors to perform operations comprising:
        searching for an NB-IoT carrier having an associated physical resource block (PRB) by scanning through frequencies associated with the plurality of channel numbers on the predefined NB-IoT channel list;

finding, as a result of the searching, no NB-IoT carrier associated with a channel number of the plurality of channel numbers on the predefined NB-IoT channel list having the associated PRB;

in response to finding no NB-IoT carrier associated with the channel number of the plurality of channel numbers on the predefined NB-IoT channel list, causing the base station to allocate the associated PRB to an available NB-IoT carrier; and camping on the available NB-IoT carrier of the plurality of NB-IoT carriers upon being allocated the associated PRB.

11. The NB-IoT device of claim 10, wherein the plurality of channel numbers is Evolved Absolute Radio Frequency Channel Numbers (EARFCNS) that indicate center frequencies of the NB-IoT carriers.

12. The NB-IoT device of claim 10, wherein the operations further comprise receiving the predefined NB-IoT channel list from a telecommunication network.

13. The NB-IoT device of claim 10, wherein the searching for the available NB-IoT carrier using the predefined NB-IoT channel list is performed upon the NB-IoT device being turned on.

14. The NB-IoT device of claim 10, wherein the searching for the available NB-IoT carrier using the predefined NB-IoT channel list is performed upon the NB-IoT device being moved to a new location.

15. The NB-IoT device of claim 10, wherein the searching for the available NB-IoT carrier using the predefined NB-IoT channel list is performed on a preset schedule.

16. The NB-IoT device of claim 10, wherein the plurality of NB-IoT carriers comprises standalone NB-IoT carriers repurposed from a Global System for Mobile Communications (GSM) carrier in the larger spectrum band, guard band NB-IoT carriers positioned between two Long-Term Evolution (LTE) carriers in the larger spectrum band, and/or in-band NB-IoT carriers positioned within LTE carriers in the larger spectrum band.

17. One or more non-transitory computer-readable media storing computer-executable instructions that, when executed by one or more processors, cause the one or more processors to perform operations comprising:

searching for a NarrowBand Internet of Things (NB-IoT) carrier having an associated physical resource block (PRB) by scanning through frequencies associated with a plurality of channel numbers on a predefined NB-IoT channel list, the plurality of channel numbers being associated with a plurality of NB-IoT carriers offered by one or more base stations;

finding, by the NB-IoT device as a result of the searching, no NB-IoT carrier associated with a channel number of the plurality of channel numbers on the predefined NB-IoT channel list having the associated PRB;

in response to finding no NB-IoT carrier associated with the channel number of the plurality of channel numbers on the predefined NB-IoT channel list having the associated PRB, allocating, by a base station of the one or more base stations, the associated PRB to an available NB-IoT carrier; and camping a radio interface on the available NB-IoT carrier of the plurality of NB-IoT carriers upon being allocated the associated PRB, wherein individual ones of the plurality of NB-IoT carriers are frequency bands within a larger spectrum band associated with a telecommunications provider.

18. The one or more non-transitory computer-readable media of claim 17, wherein the plurality of channel numbers is Evolved Absolute Radio Frequency Channel Numbers (EARFCNS) that indicate center frequencies of the NB-IoT carriers.

19. The one or more non-transitory computer-readable media of claim 17, wherein the operations further comprise receiving the predefined NB-IoT channel list from a telecommunication network.

20. The one or more non-transitory computer-readable media of claim 17, wherein the plurality of NB-IoT carriers comprises standalone NB-IoT carriers repurposed from a Global System for Mobile Communications (GSM) carrier in the larger spectrum band, guard band NB-IoT carriers positioned between two Long-Term Evolution (LTE) carriers in the larger spectrum band, and/or in-band NB-IoT carriers positioned within LTE carriers in the larger spectrum band.

* * * * *